United States Patent [19]
Cantor et al.

[11] 3,898,326
[45] Aug. 5, 1975

[54] POLYVINYLPYRROLIDONE-IODIDE COMPOSITIONS AND POLYVINYLPYRROLIDONE-IODIDE-IODINE COMPLEXES PREPARED THEREFROM

[75] Inventors: Abraham Cantor, Elkins Park, Pa.; Murray W. Winicov, Flushing, N.Y.

[73] Assignee: West Laboratories, Inc., Long Island City, N.Y.

[22] Filed: May 14, 1973

[21] Appl. No.: 360,338

[52] U.S. Cl.................................. 424/80; 424/150
[51] Int. Cl.................. A61k 15/00; A61k 17/00; A61k 19/00; A61k 21/00; A01n 11/00
[58] Field of Search............................. 424/80, 150

[56] References Cited
UNITED STATES PATENTS

| | | | |
|---|---|---|---|
| 2,706,701 | 4/1955 | Beller et al. | 424/80 |
| 2,739,922 | 3/1956 | Shelanski | 424/80 |
| 2,826,532 | 3/1958 | Hosmer | 424/80 |
| 2,853,416 | 9/1958 | Kellog | 424/80 |
| 2,900,305 | 8/1959 | Siggia | 424/80 |
| 3,028,300 | 4/1962 | Cantor et al. | 424/80 |
| 3,671,545 | 6/1972 | Halpern | 424/80 |

OTHER PUBLICATIONS

Chem. Abst. 56, 10,104 (h), (1962) — Esquefra — "Iodopoly (vinylpyrrolidone) solutions."

*Primary Examiner*—Albert T. Meyers
*Assistant Examiner*—D. W. Robinson
*Attorney, Agent, or Firm*—Howard E. Thompson, Jr.

[57] ABSTRACT

A unique PVP-iodide solid solution is prepared by drying a solution of PVP and iodide wherein the PVP:I$^-$ ratio is preferably in the range of about 2:1 to 6:1, which dried product may then be mechanically blended with elemental iodine at ambient temperature to rapidly form a stabilized PVP-iodide-iodine complex, characterized in that the resulting product comprises a single solid phase.

6 Claims, No Drawings

POLYVINYLPYRROLIDONE-IODIDE COMPOSITIONS AND POLYVINYLPYRROLIDONE-IODIDE-IODINE COMPLEXES PREPARED THEREFROM

This invention relates to an improved approach to the preparation of solid complexes of poly(N-vinyl-2-pyrrolidone), hereinafter referred to as "PVP," with iodine and a source of iodide ion (I$^-$), in which a unique PVP-iodide solid solution is first prepared by drying a solution containing PVP and an iodide, wherein the PVP:I$^-$ ratio is in the range of about 1:1 to 20:1, preferably about 2:1 to 6:1, and in which the dried product is mechanically blended with elemental iodine at ambient temperature to rapidly form a PVP-iodide-iodine complex, characterized in that the resulting product comprises a single solid phase.

It is known from our prior U.S. Pat. No. 3,028,300 dated Apr. 3, 1962 that the complexing of iodine with PVP in aqueous solution can be enhanced by including in PVP-iodine formulations a source of iodide ion, such for example as HI or an alkali metal iodide in amounts exceeding the amount of iodide formed by interreaction of iodine and PVP according to the hot formulation process described in GAF Pat. Nos. 2,706,701, 2,826,532 and 2,900,305.

It is further taught in said prior patent that when such excess iodide is incorporated in a solid product the formulation can be effected by mechanically blending a mixture of PVP, iodide, and elemental iodine at room temperature for a period of about 24 hours. This represented a substantial improvement and saving in formulating costs compared with the prior art methods as disclosed in U.S. Patents to Beller et al. No. 2,706,701, Shelanski No. 2,739,922, Hosmer No. 2,826,532 and Siggia No. 2,900,305, which called for heating mixtures of PVP and elemental iodine with continuous or intermittent mechanical mixing for periods of 18 to 24 hours or longer.

While powdered compositions formulated by the room temperature mechanical mixing of PVP, an iodide and iodine definitely provide improved iodine complexing in aqueous dilutions prepared from such powdered compositions, they are quite stable during extended periods of storage only in sealed containers. It has been found, however, that the bonding of iodine in those powdered formulations is inadequate in that the iodine vapor pressure is sufficiently high to develop a distinct iodine odor in closed containers and permit gradual loss of iodine if stored in an open or improperly sealed container, a fact which can be readily confirmed by suspending moist starch-iodide paper above a quantity of powdered formulation in either a closed or opened container. Powders exhibiting such release of iodine vapor are objectionable to workmen who must handle such powders, as in the preparation of liquid products or concentrates therefrom.

This problem is not encountered with properly formulated PVP iodine complexes prepared by the hot formulating process above mentioned but the hot process is inherently expensive and time consuming, requiring special equipment to accomplish the heating and mixing in a closed system.

It has now been discovered in accordance with the present invention that the iodine vapor pressure problem associated with poor complexing of the elemental iodine can be completely eliminated, and a distinctly superior PVP-iodide-iodine product prepared, by first forming a solid PVP-iodide composition and then cold mixing this material with elemental iodine.

The new PVP-iodide composition is prepared by drying solutions containing the PVP and iodide ion in the proper proportions, in a manner to produce, e.g. cast solids, films, flakes, granules or powders of a free flowing non-agglomerating nature. The drying can be accomplished in various ways as for example by evaporation and casting or grinding the resulting solid to a desired particle size, by drum drying to produce a flake material, or by spray drying which characteristically leads directly to finely divided and free flowing particles.

When a quantity of the powdered PVP-iodide composition is mechanically contacted with elemental iodine at room temperature, it is found that complete and uniform solid solution of the iodine can be accomplished within a period of about 2 to 3 hours. The end point of the operation can readily be determined by microscopic examination of the product since, as long as uncombined iodine remains in the product, dark flecks of elemental iodine will be visible under the microscope. When the end point is reached, however, a most significant observation is that all particles have a uniform color and appearance. This is in distinct contrast to compositions prepared by mechanical mixing of separate quantities of PVP, an iodide and iodine as disclosed in U.S. Pat. No. 3,028,300 where microscopic examination, after all traces of elemental iodine have been eliminated, shows the presence of discrete PVP and iodide particles.

The new approach, therefore, provides the double advantage of substantially shortening and simplifying the formulation or manufacturing procedure as compared with the hot process of the Beller et. al. and Siggia patents, and at the same time producing a unique and distinctly superior single phase solid product, e.g., individual particles containing the same proportions of PVP, iodide and iodine as compared with the two phase solid product obtained according to the procedure of U.S. Pat. No. 3,028,300. In this single phase product the iodine is truly complexed with a substantial elimination of significant iodine vapor pressure during storage of the powdered product as will be clearly apparent from a consideration of the illustrative examples.

In the preparation of the PVP-iodide powdered solid a small amount of water will usually remain in the material dried from aqueous solution and amounts from a trace up to about 15 percent $H_2O$ can be present provided the amount is not sufficient to cause the powdered material to agglomerate. A factor influencing the upper limit of permissible moisture will be the molecular weight of the PVP being used. In the preferred form of product, which is a spray dried powder, the moisture content will generally fall within the range of about 2 to 10 percent.

Since PVP is ordinarily a spray dried commodity, it is very easy to incorporate some iodide in the PVP solution prior to spray drying, thereby yielding the new PVP-iodide composition at substantially the same processing cost as conventional spray dried PVP.

It should be noted in this connection that when mixing together elemental iodine with PVP or with the new PVP-iodide compositions the iodine vapor penetrates and complexes with the PVP or PVP-iodide; and the more rapid take up of iodine by the new PVP iodide composition may be construed as the more rapid and complete removal of iodine vapors as formed, with a net resulting acceleration of the vaporization of elemental iodine.

It would appear, therefore, that the new PVP-iodide composition has a unique affinity for iodine vapors and can rapidly absorb large quantities of such vapors; and it follows that the new PVP-iodide composition, in suitably powdered form, should be an ideal medium or filter agent for purging air or other media containing traces of elemental iodine.

The primary use envisioned for the new PVP-iodide compositions, however, is in the improved cold formulating or manufacturing process for PVP-iodide-iodine composition exhibiting enhanced iodine complexing in the solid state. These compositions not only facilitate the production of liquid disinfectant concentrates and products of U.S. Pat. No. 3,028,300 as above mentioned, but also provide a practical means for introducing elemental iodine in a non-irritating form for various solid pharmaceutical preparations.

The PVP component of the new PVP-idoide compositions cam be any of the available forms varying in molecular weight from about 5,000 to 700,000, including without limitation K-15, K-30 and K-90 PVP. (The significance of "K" values to molecular weight and viscosity is disclosed in U.S. Pat. No. 2,706,701). As the iodide component sodium iodide is preferred, but any water soluble source of iodide ion can be employed including potassium, lithium, magnesium, hydrogen, calcium, ammonium, amine, and quaternary ammonium iodides.

The proportions of PVP to $I^-$ in the PVP-iodide composition should be in the range of about 1:1 to 20:1, preferably about 2:1 to 6:1, with PVP accounting for about 30 to 90 percent by weight, iodide ($I^-$) accounting for about 5 to 45 percent by weight, and the balance being cation which accompanies the iodide ion, and moisture as above mentioned. It should be noted in this connection that throughout the specification and claims all amounts and proportions of iodide have reference to the iodide ion, and that the expressions "iodide" and "$I^-$" are used interchangeably according to which expression best fits the particular context.

On mechanically blending elemental iodine with powdered PVP-iodide the amount of elemental iodine can vary from a trace to an amount approximately equal to the weight of the PVP. When preparing PVP-iodide-iodine products for disinfectant purposes the PVP:iodine ratio can be in the range of 1:1 to 20:1, and preferably in the range of about 2:1 to 10:1. The one-phase complexes thus obtained are considered to be new and novel products in all instances in which the iodide ($I^-$) is associated with a cation other than hydrogen (hydrogen being the cation present when iodide is formed in situ as in the hot complexing process), regardless of the ($I^-$):iodine ratio in the final product. This ratio is preferably within the range of about 0.5:1 to 5:1. In the hot complexing process the amount of iodide ($I^-$) formed in situ normally provides an ($I^-$):iodine ratio of about 0.5:1. A one-phase solid product in which exogenous HI is the source of the ($I^-$) and the ($I^-$):iodine ratio is at least 1:1, is therefore a new and novel product outside the teaching or capabilities of the prior art hot complexing process.

The novel compositions and methods in accordance with the present invention will be more readily understood from the following examples showing preparation of the new PVP-iodide compositions and the utilization thereof in preparing new and superior PVP-iodine powders. It is to be understood, however, that these examples are given by way of illustration and not of limitation. Furthermore, PVP and iodide solvents other than water, notably the lower alcohols, ketones, esters, glycol ethers, etc., may be used if desired.

With respect to the tabulated data presented in certain of these examples it should be noted that columns headed "starch response time" in the tabulations refer to iodine vapor pressures of finished products that have been stored for one day, as measured by means of iodine response of a strip or moistened starch-iodide paper positioned about 60 mm above a quantity of powder in a sealed container. In running the tests a strip of moistened starch-iodide paper is taped to a larger piece of clear inert plastic film and positioned centrally at the top of a jar containing the iodine powder and held in place in each instance by a clean cap. The color of the starch-iodide paper is viewed through the glass walls of the jar to permit recording of the time of first appearance of blue color.

Within the sealed containers the moistened starch-iodide paper dries out in about twenty minutes to an extent that further exposure is fruitless. For this reason a number of the more firmly complexed samples show values of >20 minutes. Shorter times for reaching the color end point with the starch-iodide paper are indicative of lower degrees of complexing of the iodine.

In a chloroform test of formulated products, approximately 0.5 gm of powder is shaken in 5 ml of chloroform for 30 seconds and then centrifuged to form a clear chloroform layer in which the color is evaluated visually and by spectrophotometer at the elemental iodine absorption peak (520 nm). The visual appearance of the chloroform layer was rated as being "violet" or "yellow." Some of the "yellow" solutions showed slight light absorption at 520 nm, but this absorption was not from iodine. Light absorption readings are conducted in the usual way using a conventional UV spectrophotometer and through a 1 cm cell.

EXAMPLE I

Five samples of aqueous PVP solutions were prepared containing varying ratios of PVP to iodide ($I^-$) supplied by sodium iodide as indicated in the following tabulation:

| Sample Designation | Nominal Ratio PVP:$I^-$ | Conc. in Gm/100 Ml PVP | Conc. in Gm/100 Ml NaI | % Solids |
|---|---|---|---|---|
| 1 | No iodide | 16.7 | — | 16.7% |
| 2 | 2:1 | 16.7 | 9.8 | 26.5% |
| 3 | 3:1 | 16.7 | 6.6 | 23.3% |
| 4 | 4:1 | 16.7 | 4.9 | 21.6% |
| 5 | 6:1 | 16.7 | 3.3 | 20.0% |

The solutions were spray dried in a Bowen spray drier. Each entire sample was run through, giving excellent free flowing powders.

The water content and composition of the powders based on the original solution, are given below:

| Sample Designation | Nominal Ratio PVP:I⁻ | Spray Dried Powder Composition |  |  |  |
|---|---|---|---|---|---|
| | | Water | PVP | NaI | (I⁻) |
| 1 | — | 6% | 94.0% | 0 | (0) |
| 2 | 2:1 | 6% | 59.0% | 35.0% | (29.6%) |
| 3 | 3:1 | 6% | 67.0% | 27.0% | (22.9%) |
| 4 | 4:1 | 8% | 71.0% | 21.0% | (17.8%) |
| 5 | 6:1 | 6% | 78.5% | 15.5% | (13.6%) |

It is significant to note in the foregoing tabulation that solutions spray dried under the same controlled conditions yield powders having approximately the same moisture content regardless of the variation in or absence of sodium iodide component.

EXAMPLE II

Quantities of spray dried PVP-iodide as described in Example I, Sample 2, and having a nominal PVP:iodide ratio of 2:1 were combined with varying amounts of pulverized iodine by rolling in sealed containers for 2–3 hours at an ambient temperature of 20°–25°C. At the end of this time all traces of elemental iodine had disappeared. Pertinent data concerning the resulting PVP-iodide-iodine powders and their performance in the starch response and chloroform tests are tabulated below.

| | Parts by Weight | | | | | Starch | | |
| | PVP-Iodide | (Provides) | | Pulv'd Iodine | Manufacturing Ratios PVP:I⁻:Iodine | Initial Titrat. Iodine | Resp. Time (Mins) | Chloroform Test |  |
| | | (PVP) | (I⁻) | | | | | Abs. | Color |
| 1) | 95.0 | (56.0) | (28.1) | 5.0 | 11:5.6:1 | 4.8% | >20 | 0.05 | Yellow |
| 2) | 90.0 | (53.6) | (26.6) | 10.0 | 5.4:2.7:1 | 9.3% | >20 | 0.08 | Yellow |
| 3) | 70.0 | (41.6) | (21.4) | 30.0 | 1.4:0.71:1 | 27.1% | 8 | 0.21 | Violet |
| 4) | 60.0 | (35.7) | (17.8) | 40.0 | 0.89:0.44:1 | 35.4% | 2 | 1.94 | Violet |

EXAMPLE III

Quantities of spray dried PVP-iodide as described in Example I, Sample 3, and having a nominal PVP-iodide ratio of 3:1 were combined with varying amounts of pulverized iodine by rolling in sealed containers for 2–3 hours at an ambient temperature of 20°–25°C. At the end of this time all traces of elemental iodine had disappeared. Pertinent data concerning the resulting PVP-iodide-iodine powders and their performance in the starch response and chloroform tests are tabulated below.

| | Parts by Weight | | | | | Starch | | |
| | PVP-Iodide | (Provides) | | Pulv'd Iodine | Manufacturing Ratios PVP:I⁻:Iodine | Initial Titrat. Iodine | Resp. Time (Mins) | Chloroform Test |  |
| | | (PVP) | (I⁻) | | | | | Abs. | Cobr |
| 5) | 95.0 | (63.6) | (21.8) | 5.0 | 13:4.4:1 | 4.7% | >20 | 0.02 | Yellow |
| 6) | 90.0 | (60.3) | (20.6) | 10.0 | 6.0:2.1:1 | 9.3% | >20 | 0.01 | Yellow |
| 7) | 70.0 | (46.9) | (16.0) | 30.0 | 1.6:0.53:1 | 27.6% | 10 | 0.19 | Violet |
| 8) | 60.0 | (40.2) | (13.7) | 40.0 | 1.0:0.34:1 | 35.4% | 2 | 1.63 | Violet |

EXAMPLE IV

Quantities of spray dried PVP-iodide as described in Example I, Sample 4, and having a nominal PVP-iodide ratio of 4:1 were combined with varying amounts of pulverized iodine by rolling in sealed containers for 2–3 hours at an ambient temperature of 20°–25°C. At the end of this time all traces of elemental iodine had disappeared. Pertinent data concerning the resulting PVP-iodide-iodine powders and their performance in the starch response and chloroform tests are tabulated below.

| | Parts by Weight | | | | | Starch | | |
| | PVP-Iodide | (Provides) | | Pulv'd Iodine | Manufacturing Ratios PVP:I⁻:Iodine | Initial Titrat. Iodine | Resp. Time (Mins) | Chloroform Test |  |
| | | (PVP) | (I⁻) | | | | | Abs. | Color |
| 9) | 95.0 | (67.4) | (16.9) | 5.0 | 13.5:3.4:1 | 4.6% | >20 | 0.01 | Yellow |
| 10) | 90.0 | (64.0) | (16.0) | 10.0 | 6.4:1.6:1 | 9.3% | >20 | 0.01 | Yellow |
| 11) | 70.0 | (49.7) | (12.5) | 30.0 | 1.7:0.42:1 | 27.2% | 8 | 0.22 | Violet |
| 12) | 60.0 | (42.6) | (10.7) | 40.0 | 1.1:0.27:1 | 35.8% | 2 | 2.13 | Violet |

EXAMPLE V

Quantities of spray dried PVP-iodide as described in Example I, Sample 5, and having a nominal PVP-iodide ratio of 6:1 were combined with varying amounts of pulverized iodine by rolling in sealed containers for 2–3 hours at an ambient temperature of 20°–25°C. At the end of this time all traces of elemental iodine had disappeared. Pertinent data concerning the resulting PVP-iodide-iodine powders and their performance in the starch response and chloroform tests are tabulated below.

|  | Parts by Weight | | | | | | Starch | | |
|---|---|---|---|---|---|---|---|---|---|
|  | PVP-Iodide | (Provides) | | Pulv'd | Manufacturing Ratios | Initial Titrat. | Resp. Time | Chloroform Test | |
|  |  | (PVP) | (I⁻) | Iodine | PVP:I⁻:Iodine | Iodine | (Mins) | Abs. | Color |
| 13) | 95.0 | (74.5) | (12.9) | 5.0 | 15:2.6:1 | 4.7% | >20 | 0.11 | Yellow |
| 14) | 90.0 | (70.6) | (12.2) | 10.0 | 7.1:1.2:1 | 9.1% | >20 | 0.05 | Yellow |
| 15) | 80.0 | (62.7) | (10.9) | 20.0 | 3.1:0.54:1 | 17.7% | >20 | 0.02 | Yellow |
| 16) | 60.0 | (47.0) | (8.2) | 40.0 | 1.2:0.21:1 | 35.0 | 2 | 2.80 | Violet |

EXAMPLE VI

Quantities of spray dried PVP (K-30) containing 97 percent PVP, 3 percent moisture and no iodide were combined with varying amounts of pulverized iodine by rolling in sealed containers at an ambient temperature of 20°–25°C. until all traces of elemental iodine disappeared, requiring about 4 hours. Pertinent data concerning the resulting PVP-iodine powders and their performance in the starch response and chloroform tests are tabulated below.

The data presented in Examples VI and VII indicate that iodine complexing (or lack of complexing) in the powders taught in U.S. Pat. No. 3,028,300 is substantially the same as iodine complexing in PVP powder itself, without iodide. This is not to be confused, however, with the marked effect of added iodide on the complexing of iodine by PVP in aqueous solutions as taught in U.S. Pat. No. 3,028,300.

EXAMPLE VIII

Following the procedure of Example I, 250 parts (anhydrous basis) of K-90 PVP were dissolved in a mini-

|  | Parts by Weight | | | | | | Starch | | |
|---|---|---|---|---|---|---|---|---|---|
|  | K-30 PVP | (Provides) | | Pulv'd | Manufacturing Ratios | Initial Titrat. | Resp. Time | Chloroform Test | |
|  |  | (PVP) | (I⁻) | Iodine | PVP:Iodine | Iodine | (Mins) | Abs. | Color |
| 17) | 95.0 | (92.0) | (O) | 5.0 | 18.4:1 | 3.6% | 7 | Dis. | *Red-Brown |
| 18) | 90.0 | (87.3) | (O) | 10.0 | 8.7:1 | 7.3% | 2 | Dis. | Red-Brown |
| 19) | 80.0 | (77.7) | (O) | 20.0 | 3.9:1 | 16.5% | <1 | Dis. | Red-Brown |
| 20) | 70.0 | (68.0) | (O) | 30.0 | 2.3:1 | 25.3% | <1 | Dis. | Red-Brown |

*On addition of powder to chloroform, a violet coloration first appears, followed by substantially complete solution of the powder. In contrast to this a fully complexed PVP-iodine powder prepared by the hot process is substantially insoluble in chloroform, produces only yellow coloration in the chloroform layer, and exhibits a Starch Response time of >20.

It is evident from this example that the take-up of iodine by PVP at ambient temperature accomplishes no appreciable complexing of iodine in the resulting powder. Furthermore, similar experiments in which the rolling at ambient temperature is extended for 24 hours show no significant change in the Starch Response time and chloroform tests.

EXAMPLE VII

A set of PVP-iodide-iodine powdered compositions were prepared as disclosed in U.S. Pat. No. 3,028,300 Example II (Samples 6, 7, 8 and 9), using the same rolling procedure and pulverized iodine as in the previous examples of this application. The elemental iodine appeared to be completely eliminated after about 4 hours of rolling, but the rolling was continued to 24 hours so as to conform with U.S. Pat. No. 3,028,300. The analytical results are given below in tabular form corresponding to the previous tabular exposition of data. K-30 PVP with 3 percent moisture was used as the PVP source, and the iodides are identified in the table.

mum amount of water, to which was added 33 parts of potassium iodide and sufficient additional water to provide a 7.1 percent W/V solution of solids. The ratio of PVP:iodide in this composition was 10:1. The solution was allowed to dry in a stainless steel pan at 50°C in a forced air draft, and the dry film was scraped off the pan and ground to a powder. A portion of the PVP-iodide powder was combined with iodine in the ratio of 24 parts of PVP-iodide powder to one part of pulverized iodine, by rolling, as described in Examples II, III, etc., for 3 hours At the end of this time the titratable iodine content was 3.9 percent; hardly any iodine had reacted with the PVP. The manufacturing ratio of PVP:iodide:iodine was approximately 20:2:1. The powder had a starch response time of greater than 20 minutes. A second PVP:iodide:iodine powder, similarly made from the same PVP-iodide powder, with manufacturing ratio of approximately 10:1:1, likewise did not show a starch test in 20 minutes.

EXAMPLE IX

Following the procedure of Example I, 250 parts of

|  | Parts by Weight (Provides) | | | | Pulv'd | Mfg. Ratio | Initial Titrat. | Starch Resp. Time | Chloroform Test | |
|---|---|---|---|---|---|---|---|---|---|---|
|  | PVP | (PVP) | MI | (I⁻) | Iodine | PVP:I⁻:I | Iodine | (Mins) | Abs. | Color |
| "6)" | 30 | (29) | 60 KI | (46) | 10 | 2.9:4.6:1 | 9.1 | <1 | Dis. | *Red-Brown |
| "7)" | 40 | (39) | 50 NaI | (42) | 10 | 3.9:4.2:1 | 9.1 | <1 | Dis. | Red-Brown |
| "8)" | 50 | (48.4) | 40 NaI | (34) | 10 | 4.8:3.4:1 | 9.0 | <1 | Dis. | Red-Brown |
| "9)" | 70 | (68) | 20 NaI | (17) | 10 | 6.8:1.7:1 | 8.9 | 1 | Dis. | Red-Brown |

*Substantially all of the composition, exclusive of the iodide salt, dissolved in the chloroform. A violet coloration appeared first, on addition of the powder to the chloroform.

K-15 PVP (anhydrous basis) were dissolved in water, followed by 13.7 parts (anhydrous basis) of magnesium iodide and sufficient additional water to provide a 26.4 percent W/V solution of solids. The ratio of PVP:iodide in this composition was 20:1. The solution was spray dried to 4 percent moisture content, and 19 parts of the dried powder were combined with 1 part of pulverized iodine by rolling at room temperature as described in Example II during a 2½ hour interval. The titratable iodine content was found to be 4 percent. Manufacturing ratio of PVP:iodide:iodine was approximately 17:0.8:1. The powder had a starch response time of greater than 20 minutes.

Various changes and modifications in the procedures herein disclosed for preparing single-phase PVP-iodide compositions and utilizing the same in the rapid, ambient temperature production of PVP-iodide-iodine complexes may occur to those skilled in the art, and to the extent that such changes and modifications are embraced by the appended claims it is to be understood that they constitute part of the present invention.

We claim:

1. The solid PVP-iodide product obtained by first preparing an aqueous solution of poly(N-vinyl-2-pyrrolidone) and a water soluble iodide selected from the group consisting of sodium, potassium, lithium, magnesium, hydrogen, calcium, ammonium, amine and quaternary ammonium iodides in proportions to provide a PVP:I$^-$ ratio in the range of about 1:1 to 20:1, and drying said aqueous solution to form a PVP-iodide solid solution.

2. The solid PVP-iodide product as defined in claim 1 in the form of a powder.

3. The PVP-iodide powder as defined in claim 2, wherein said powder contains an amount of moisture ranging from a trace to about 15 percent by weight.

4. The process for formulating PVP-iodide-iodine compositions that comprises mechanically blending the PVP-iodide solid solution as defined in claim 2 with elemental iodine at ambient temperature, to thereby obtain a single-phase solid in which the iodine is uniformly complexed with said PVP-iodide solid solution, the amount of iodine thus complexed with the PVP-iodide being in the range of a trace amount to an amount approximately equal to the weight of PVP.

5. The process as defined in claim 4, wherein the amount of combined iodine is such as to provide a PVP:iodine ratio within the range of 1:1 to 20:1.

6. The process as defined in claim 4, wherein the amount of combined iodine is such as to provide a PVP:iodine ratio within the range of 2:1 to 10:1 and a ratio of iodide (I$^-$) to iodine in the range of 0.5:1 to 3:1.

* * * * *